United States Patent Office 3,076,090
Patented Jan. 29, 1963

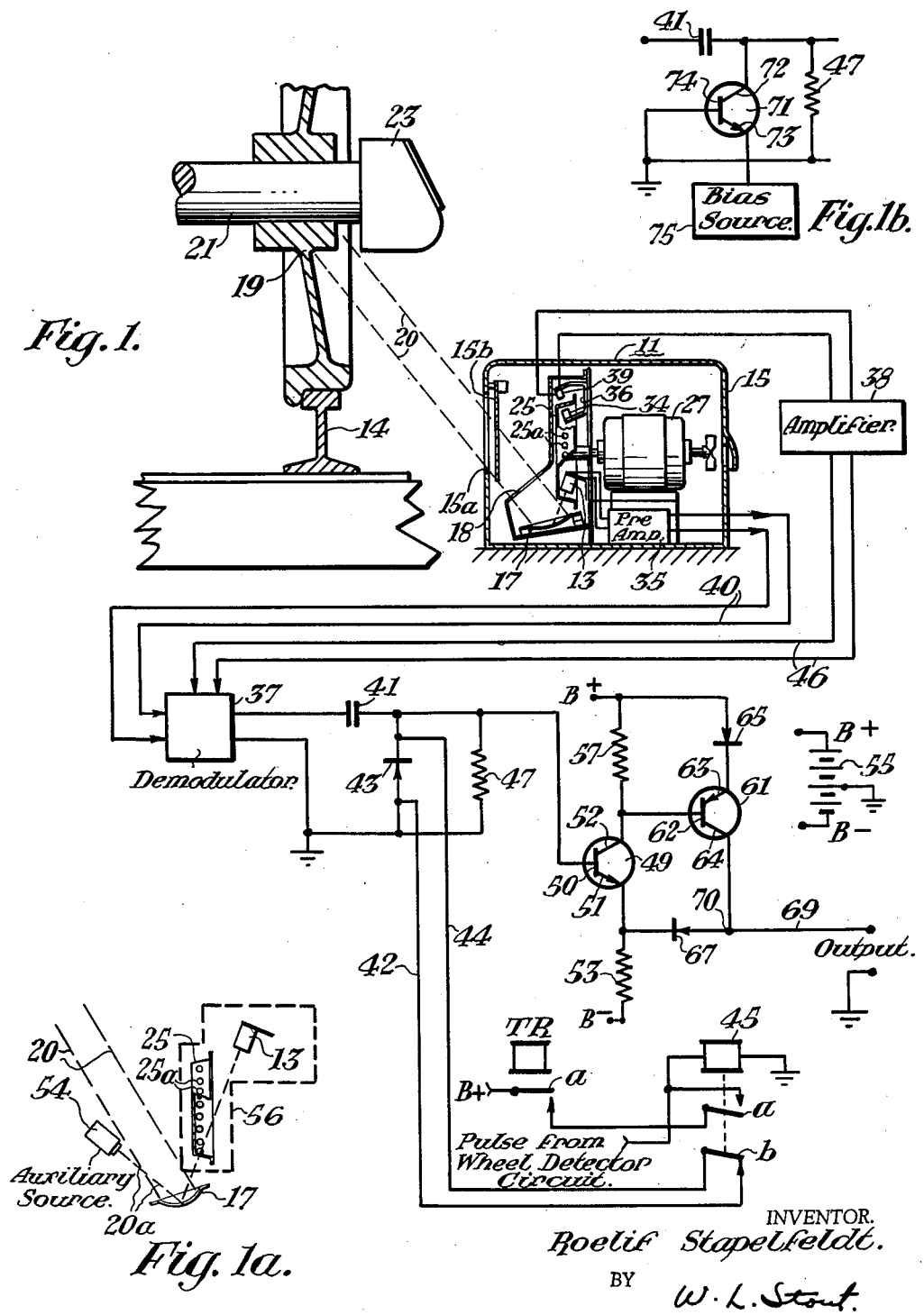

3,076,090
HOT BEARING DETECTOR CIRCUITS
Roelif Stapelfeldt, Wilkinsburg, Pa., assignor to Westinghouse Air Brake Company, Wilmerding, Pa., a corporation of Pennsylvania
Filed Jan. 25, 1960, Ser. No. 4,336
13 Claims. (Cl. 246—169)

The present invention relates to a radiant energy detecting apparatus and more particularly to an improved apparatus and circuitry for determining the temperature of wheel bearings.

The copending application for Letters Patent of the United States Serial No. 829,272 of P. N. Bossart and T. J. Blocher, Jr., filed on July 24, 1959, entitled Radiant Energy Detector and assigned to the same assignee as the present invention discloses an overall system for detecting, analyzing and indicating overheated wheel bearings on railroad cars. The present invention discloses a modification to the apparatus and circuitry of the foregoing application and is directed to a circuit for comparing the temperature of each wheel bearing to the ambient temperature.

Recent advances in the sensitivity of heat sensitive or photoconductive cells for detecting radiant energy, that is, infrared radiation, from low temperature sources have made it commercially feasible to sense the temperature of the bearings of a moving train by apparatus located along the track wayside. These heat sensitive cells respond directly to certain ranges or quanta of heat radiation and the speed of response may be in the order of one to ten microseconds. The rapid speed of response of the cells assures that the signal obtained by an associated system is independent of the exposure time of the cell to the source of radiant energy, that is, the system is relatively independent of the speed of the moving trains.

The detector cells employed are especially sensitive since they are arranged to accept radiation from a target other than the hot bearing itself. As is known, a journal box encloses the wheel bearings so that a cell must be arranged to receive radiation from either the journal box, the axle, or the wheel at a point somewhat removed from the bearings themselves. Wheel bearing temperatures above 300° to 400° are dangerous; however, it has been found that there is large temperature gradient from the bearings to a point on the journal box cover or on the wheel, therefore, the radiant energy received by the photoconductive cell from the cover or wheel may represent a much lower temperature than the actual bearing temperature. It has also been found that a more accurate representative indication of the actual temperature of the bearings is obtained by viewing a portion of the wheel at a point close to the axle than is obtained by viewing the journal box.

In the radiant energy detector disclosed in the aforementioned application, Serial No. 829,272, as well as in a number of other devices with which I am familiar, a chopper means, that is, a device for periodically modulating the radiant energy, is arranged to alternately admit and reject radiation emanating from a target to the detector cell. Since the radiation is alternately admitted and rejected, a periodic output is obtained from the cell which is converted to an alternating current electrical signal. The alternating current signal thus obtained permits the use of alternating current amplifiers instead of direct current amplifiers which, as is known, are relatively unstable at lower power levels due to drift.

To determine the temperature of the bearings the signal obtained when the cell is receiving radiant energy from a bearing should be compared with the signal obtained when the cell is receiving radiant energy from the external ambient temperature, that is, when the cell is viewing the underside of the train other than the wheels themselves. However, it has been found that when the radiation is interrupted by a chopper the temperature, i.e., the radiant energy reference to which the radiation due to the bearing is compared, may not be the ambient temperature, but rather it may be the temperature, i.e. the radiant energy, of the chopper means itself. This is, of course, due to the fact that for part of the time the cell is screened by the chopper from receiving external radiation, and obviously the chopper itself radiates some heat energy to the cell.

In the detector disclosed in the aforementioned application Serial No. 829,272, when the chopper is colder than the outside ambient temperature the heat sensitive cell may be considered to provide a positive signal when it is observing ambient temperature. If, however, the chopper is heated in any way, say by the heat due to the motor or by being mounted within a heated enclosure, the chopper may be at a temperature above the outside ambient temperature, and the cell will thus provide a relatively negative signal when it is observing ambient temperature. For a given bearing (target) temperature and a given ambient temperature it can be understood that if the chopper is colder than ambient temperature a signal of one amplitude will be provided to indicate the difference between the bearing temperature and the ambient temperature. However, at the same ambient temperature, and the same bearing (target) temperature, but if the chopper is hotter than the ambient temperature, a different signal will be provided. Thus, the output from the detecor cell can conceivably be a two-valued function dependent on whether the target temperature is above or below the chopper temperature.

To provide a single-valued function of the detector cell output versus target temperature, that is, to assure that each given output from the cell is representative of only one target temperature, and thus to eliminate the aforementioned ambiguities a phase sensitive comparator or demodulator may be employed such as shown in the copending application of P. N. Bossart, Serial No. 1,100, filed on January 7, 1960 for Radiant Energy Detectors, and assigned to the same assignee as the present invention.

Accordingly, it is a principal object of my invention to provide an improved circuitry for a radiation detection apparatus.

It is another object of my invention to provide improved circuitry and apparatus for comparing the temperature of passing wheel bearings with the ambient temperature.

It is another object of my invention to provide improved circuitry and apparatus for detecting hot wheel bearings in which the temperature of each bearing is compared against a set reference.

In the attainment of the foregoing objects I provide a circuit including means for receiving an output from a heat sensitive cell and providing an output which is a single-valued function of the radiant energy received by said cell, and a circuit for clamping the output of the demodulating means which circuit includes a series connected capacitor, a parallel connected current control device, and a parallel connected resistor. Means are also provided for disabling the clamping circuit until a predetermined time.

Other objects and advantages of my invention will become more apparent from the following description taken in connection with the accompanying drawings in which like reference characters refer to like elements throughout and in which:

FIG. 1 is a view of a hot bearing detector including a schematic diagram of a clamping circuit in accordance with the present invention;

FIG. 1a is a sketch of a modification of the hot bearing detector apparatus of FIG. 1; and FIG. 1b is a schematic diagram of a modification to the clamping circuit of FIG. 1.

Referring to FIGURE 1, a radiant energy detecting unit 11 includes a heat sensitive detector cell 13 contained within a housing 15. Housing 15 may be mounted on any suitable support adjacent the track rail 14 independent of the railway track such that unit 11 is stable and is least subject to vibrations when a train is passing thereby. External radiant energy passes through an opening 15a in the housing 15 and impinges on a parabolic reflective mirror 17. A silicon window 18 is mounted to filter radiant energy of a wave length of more than 3 microns from passing on to mirror 17. Mirror 17 focuses, that is, reflects the received radiant energy through the apertures 25a in a chopper wheel 25 onto cell 13. Chopper 25 is rotated at approximately 400 r.p.m. by a suitable motor 27 to periodically modulate the radiant energy and thus provide a relatively high frequency signal.

A weather plate 15b is biased as by a spring, not shown, to cover opening 15a. Plate 15b is actuated by associated track circuitry of any suitable known type when a train enters the track section to uncover the opening 15a and permit radiant energy to impinge on mirror 17 for focusing on cell 13.

Detecting unit 11 is mounted perpendicularly to the rail 14 such that cell 13 receives the radiation emanating from an area of approximately four square inches on a car wheel 19 at a point immediately beneath the axle 21. The radiant energy is indicated by the dotted lines 20 angled approximately 55° with the horizontal plane. Axle 21 is, of course, journaled on bearings, not shown, mounted in the journal box 23.

The output of the radiant energy detector 11 is converted to an electrical signal by a preamplifier 35, of any suitable known type, and connected through leads 40 to a phase comparator or demodulator 37, also of any suitable well known type, as shown, for example, on page 387 of Pulse and Digital Circuits by Millman and Taub, published by McGraw-Hill Book Company, 1956.

A periodic reference voltage for demodulator 37 may be provided as described in detail in the aforementioned application of P. N. Bossart, Serial No. 1,100. Briefly a source of light or lamp 34 is mounted on one side of the chopper 25 and is arranged by means of an adjustable clamp or bracket 36 to pass its light through apertures 25a in chopper 25 to a photosensitive transistor 39, of any suitable known type, also mounted on bracket 36 and positioned on the opposite side of chopper 25.

The chopper 25 in combination with lamp 34 and phototransistor 39 provides a reference periodic signal generator. Obviously, since the light from lamp 34 is chopped by chopper 25, phototransistor 39 will develop a periodic output voltage. Bracket 36 permits lateral adjustment of the lamp 34 and the phototransistor 39 along the periphery of the chopper 25 such that a positive phase reference signal is provided by phototransistor 39 when radiant energy is being passed through an aperture 25a to cell 13. The output from phototransistor 39 is coupled to a suitable amplifier 38 of any well known type. The output of amplifier 38 is in turn coupled through leads 46 to demodulator 37 as a periodic reference voltage.

If a relatively higher amplitude or more positive output from cell 13 occurs during the positive phase portion of the periodic reference signal coupled to demodulator 37, the output voltage from demodulator 37 will be positive. Likewise, if the higher amplitude or more positive output from cell 13 occurs during the negative portion of the periodic reference signal coupled to demodulator 37, the output voltage from demodulator 37 will be negative. Thus, demodulator 37 provides an output voltage from cell 13 which is a single-valued function of the target temperature.

Alternatively, in order to obtain a single-valued function a fixed amount of radiant energy indicated by dotted line 20a from an auxiliary source may be added to the incoming radiation 20, see FIG. 1a. Here, an auxiliary source 54, which may be a small light, provides a fixed and constant amount of radiant energy 20a to cell 13. Cell 13 will thus provide an output which is referenced from the radiant energy level of source 54.

Another alternative structure for providing an output signal from cell 13 which is a single-valued function of the target temperature is to cool the chopper 25 and cell 13 to a temperature below any conceivable target temperature, as by placing the chopper and the cell in a refrigerated compartment 56.

Regardless of the means used to assure a single-valued output, the change in the voltage output from the heat sensitive cell with the change in the target temperature should be linear or correctable. Any variation in the voltage output versus target temperature must occur at a rate slow in comparison to the rate of presentation of targets to the detector. Such a variation might occur, for example, if the bearing detector employs a chopper means whose temperature is subject to slow changes due to, for example, heat from the motor used in rotating the chopper, heat from any de-icing equipment, or changes in the amount of direct sunlight falling on the detector housing.

The system under consideration in the present case is of the nature of that generally disclosed in the aforementioned copending Bossart application, Serial No. 1,100, and the description herein above has been directed essentially to the features of application Serial No. 1,100 up to and including the phase comparator 47 shown therein. In the present application, the modulator 37 corresponds to phase comparator 47 of copending application Serial No. 1,100. The instant invention is an improved arrangement of the Bossart system and utilizes clamp circuitry, which I will now describe, receiving the output of demodulator 37 for maintaining a chosen D.C. level for voltage outputs supplied by the demodulator.

The output of demodulator 37 is coupled to a clamping circuit. The clamping circuit includes a series connected capacitor 41, a parallel connected diode 43, and a parallel connected load resistor 47. The cathode of diode 43 is connected to one terminal of capacitor 41 and the anode of diode 43 is connected to ground.

The principal concepts in using the clamping circuit to provide an ambient temperature reference to which the temperature of the wheel bearings can be compared are first; that the lowest direct current signal level is developed by the demodulator 37 when the cell 13 is receiving radiant energy from a shaded object at ambient temperature; and second, that the signal developed by the demodulator 37 when the cell 13 is receiving energy from a shaded object at ambient temperature is constant or at least changes relatively slowly. It is this signal to which the temperature of the wheel bearings should be compared.

Capacitor 41 and resistor 47 have a relatively long time constant for processing signals developed by slowly moving wheels since such signals will be of relatively longer duration and have a slower rise and fall time. In one embodiment, capacitor 41 is 50 mfd. and resistor 47 is 47,000 ohms. As can be appreciated, the time constant of the clamping circuit also includes the input resistance of an output transistor 49 to be described hereinbelow and the back resistance of diode 43.

The operation of the clamping circuit is substantially as follows: Assume initially that capacitor 41 has no charge. A train entering the track section will energize the circuitry of detector unit 11 causing plate 15b to open and motor 27 to start rotating chopper 25. Cell 13 will then begin to receive chopped or modulated radiant energy from external targets. Demodulator 37 will provide an output dependent on the relative difference between the temperature of chopper 25 and the external ambient temperature. If the chopper is slightly warmer than the ambient temperature, cell 13 will provide an output causing the demodulator to develop a negative D.C. signal. This negative signal will be coupled to capacitor 41 and diode 43 and be quickly discharged through diode 43 to ground. No output will be developed across load resistor 47.

Assume next that a train wheel moves past the viewing sector of cell 13, that is, cell 13 receives radiant energy from a passing wheel bearing. If the temperature of the wheel bearing is higher than the chopper temperature, then the cell 13 will provide an output causing the demodulator 37 to develop a positive D.C. signal. This positive signal will be coupled through diode 43 and an output will appear across load resistor 47 until capacitor 41 charges to the full value of the positive signal from demodulator 37. After the wheel moves past the viewing sector of cell 13, the cell again receives radiant energy of less intensity from the ambient temperature and demodulator 37 will develop a relatively less positive voltage. Capacitor 41 which has been charged to a value corresponding to the bearing temperature will discharge very quickly through diode 43 to the lowest positive signal presented.

Although the clamp circuit will set very quickly to the lowest positive signal presented, because of the long time constant of several seconds determined principally by capacitor 41 and resistor 47, the clamp circuit will be adjusted very slowly to any higher minimum positive signal values.

When demodulator 37 receives an output from cell 13 indicating a next source of high radiation intensity, it again provides a relatively more positive output which will appear across load resistor 47 until capacitor 41 charges to this positive value. Again, when cell 13 views a source at a lower temperature providing a lower radiation intensity, demodulator 37 develops a less positive signal and capacitor 41 quickly discharges through diode 43 to this lowest positive level.

Since the ambient temperature is compared to the temperature of the chopper 25, and the temperature of the wheel bearings is compared to the chopper temperature, the overall result is that the chopper temperature effectively cancels and the wheel bearing temperature is referenced to ambient temperature.

The output developed across resistor 47 is a voltage varying in a positive direction and will be referenced from ground or zero potential to indicate the relative difference in any two contiguous signal outputs from demodulator 37.

The signal developed across resistor 47 is coupled to an output amplifier comprising an N-P-N transistor 49 and a P-N-P transistor 61. Transistor 49 is connected essentially as an emitter follower with the input being coupled to its base 50 and the output being coupled from its collector 52 to the base 62 of transistor 61. The output of transistor 61 is taken from its collector 64 through lead 69. Transistor 49 is biased by connecting its emitter 51 through a resistor 53 to the negative terminal B— of a battery 55 (shown at the right of the circuit) and its collector 52 through a resistor 57 to the positive terminal B+ of battery 55. Transistor 61 is biased by connecting its emitter 63 through diode 65 to B+, and its collector 64 through a diode 67 and resistor 53 to B—.

Diode 65 provides temperature compensation, that is, in the absence of an input signal it prevents transistor 61 from conducting even if the temperature should rise. Diode 67 and transistor 49 are both of silicon and the voltage drop from the anode to the cathode of diode 67 will approximately equal the voltage drop from the base 50 to emitter 51 of transistor 49 such that a zero voltage at the base 50 of transistor 49 will provide zero volts at point 70.

Briefly, the operation of the transistor amplifiers is as follows. A positive input to base 50 will cause N-P-N transistor 49 to conduct more heavily and the potential on its collector 52 to decrease, i.e., makes the collector more negative. This provides a relatively more negative voltage to the base 62 of transistor 61 and causes transistor 61 to conduct more heavily which in turn causes its collector 64 to provide a positive output.

A cloudless sky presents an equivalent target temperature which may at times be lower than the ambient temperature. Therefore, there exists a possibility of setting the clamp circuit to a signal level lower than the ambient temperature, and the clamp circuit, which has a relatively long time constant, may not in the case of a fast moving train allow the reference voltage to rise from the level representative of clear sky temperature to a level representative of ambient temperature before the wheel bearings begin to be monitored. I therefore provide means for disabling the clamping circuit until a first passing wheel passes a given point as indicated below and the cell is viewing the underside of the passing cars.

In FIG. 1, the clamp diode is short circuited to a relay contact until the first wheel of the train moves past a point adjacent the heat sensitive cell and the cell is being shielded from the sky by the cars and is receiving radiant energy from the underside of the cars. Diode 43 is short circuited and the clamp circuit disabled by lead 44, back contact *b* of a relay 45 and lead 42 to ground reference. Track relay TR is the usual track relay which is normally energized when the associated track section is occupied and deenergized when a train occupies the track section. Thus when a train enters the track section, back contact *a* of relay TR closes. Relay 45 is energized to pick up its front contacts *a* and *b* by a pulse developed by the wheel inductor as a train wheel passes thereover, as explained fully in application Serial No. 829,272, supra. Relay 45 remains energized, as long as relay TR is deenergized, over a circuit traceable from ground, the coil of relay 45, front contact *a* of relay 45 and back contact *a* of relay TR to B+. When relay 45 is energized it opens its back contact *b* and removes the short circuit from diode 43 and enables the clamping circuit.

Alternatively, as shown in FIG. 1*b*, the clamping circuit may employ an N-P-N type transistor 71 in place of diode 43 and the clamping circuit will operate as follows. The transistor will have its collector 72 connected to capacitor 41, its base 74 connected to ground and its emitter 73 connected to a bias source 75 which biases the transistor 71 to be normally conducting. When the first wheel is detected, as described above, bias source 75 is energized to bias emitter 73 to be essentially open circuited and only the diode formed by collector 72 to base 74 of the transistor 71 is then effectively in the circuit; the operation of the diode formed by the transistor will then be the same as diode 43, described above.

Although I have herein shown and described only one form of apparatus embodying my invention, it will be understood that various changes and modifications may be made therein within the scope of the appended claims without departing from the spirit and scope of my invention.

Having thus described my invention, what I claim is:

1. A device for detecting overheated wheel bearings including a heat sensitive cell for developing an output in response to radiant energy impinging thereupon, means for periodically modulating the radiant energy from external targets impinging on said cell, heat control means cooperating with said cell for developing output signals from said cell of amplitudes which are single-valued functions of the target temperature, and clamping means for holding one amplitude extreme of the output signals from said cell to a given reference level.

2. A device for detecting overheated wheel bearings including a heat sensitive cell for developing an output in response to radiant energy impinging thereupon, means for periodically modulating the radiant energy from external targets impinging on said cell, and circuitry for comparing the radiant energy emanating from the wheel bearings with the radiant energy emanating from the external ambient temperature; said circuitry comprising heat control means cooperating with said cell for developing output signals of amplitudes which are single-valued functions of the target temperature, and clamping means for holding the lower amplitude extreme of the output signal from said cell to zero reference level.

3. In a device for detecting overheated wheel bearings including a heat sensitive cell for developing an output in response to radiant energy impinging thereupon, means for modulating the radiant energy from external targets including that energy emanating from passing wheel bearings which impinges on said cell, and means for converting the output of said cell into electrical signals; circuitry for cancelling the output signal from said cell due to the radiant energy emanating from said modulating means and for comparing the output signal from said cell due to radiant energy emanating from the wheel bearings with the output signal from said cell due to the radiant energy emanating from the external ambient temperature; said circuitry comprising, in combination, heat control means cooperating with said cell for developing output signals of amplitudes which are single-valued functions of the target temperature, and clamping means for holding the lower amplitude extreme of the output signal from said cell to zero reference level.

4. In a device for detecting overheated wheel bearings, the combination comprising, a heat sensitive cell for developing an output in response to radiant energy impinging thereupon, means for focusing radiant energy from external targets onto said cell, means for modulating the radiant energy focused on said cell, means including said modulating means for developing a reference voltage, a demodulator, means for connecting said reference voltage to said demodulator, means connecting the output of said cell to said demodulator, said demodulator providing output signals which are single-valued functions of the relative temperature of the target from which said cell is receiving radiant energy as compared to the temperature of said modulating means, and clamping means receiving the output of said demodulator for providing a positive going output referenced from ground potential.

5. In a device for detecting overheated wheel bearings, the combination comprising, a heat sensitive cell for developing an output in response to radiant energy focused thereupon, means including said chopper for developing a reference voltage, phase comparing means for comparing the output of said cell with said reference voltage for providing an output voltage which is a single-valued function of the received radiant energy, a clamping circuit receiving the output of said phase comparing means, said clamping circuit comprising a series connected capacitor, a parallel connected unidirectional current control device and a parallel connected load resistor, said current control device being connected for short circuiting to ground reference any negative signals appearing on said capacitor, whereby any voltage developed across said load resistor is positive and referenced from ground or zero potential.

6. In a device for detecting overheated wheel bearings, the combination comprising, a heat sensitive cell for developing an output in response to radiant or heat energy impinging thereupon, means for focusing radiant energy from external targets onto said heat sensitive cell, chopper means for modulating the energy focused onto said cell, an auxiliary source of radiant energy focused onto said cell for providing an output form said cell which is referenced from a set level, phase comparing means for comparing the output of said cell with said reference voltage to provide an output voltage which is a single-valued function of the received radiant energy, a clamping circuit receiving the output of said phase comparing means, said clamping circuit comprising a series connected capacitor, a parallel connected diode and a parallel connected load resistor, said diode being connected with its cathode connected on one terminal of said capacitor and its anode connected to ground reference for short circuiting any negative signals appearing on said capacitor, whereby any voltage developed across said load resistor is positive and referenced from ground or zero potential.

7. In a device for detecting overheated wheel bearings, the combination comprising, a heat sensitive cell for developing an output in response to radiant or heat energy impinging thereupon, means for focusing radiant energy from external targets onto said heat sensitive cell, chopper means for modulating the energy focused onto said cell, means for cooling said chopper for providing an output from said cell which is referenced to a set level, phase comparing means for comparing the output of said cell with said reference output to provide an output voltage which is a single-valued function of the received radiant energy, a clamping circuit receiving the output of said phase comparing means, said clamping circuit comprising a series connected capacitor, a parallel connected diode and a parallel connected load resistor, said diode being connected with its cathode connected to one terminal of said capacitor and its anode connected to ground reference for short circuiting any negative signals appearing on said capacitor, whereby any voltage developed across said load resistor is positive and referenced from ground or zero potential.

8. In a device for detecting overheated wheel bearings including a heat sensitive cell for developing an output in response to radiant energy impinging thereupon, means for focusing radiant energy from external targets including that energy emanating from passing wheel bearings onto said heat sensitive cell, chopper means for modulating the energy focused onto said cell, means for converting the output of said cell into electrical signals; the combination comprising, heat control means cooperating with said cell for developing an output from said cell which is a single-valued function of the target temperature, a biasing source, a clamping circuit, means for connecting the output from said cell to said clamping circuit, said clamping circuit comprising a series connected capacitor, a parallel connected N–P–N transistor and a parallel connected resistor, said transistor having its collector connected to said capacitor, its base connected to ground, and its emitter connected to said biasing source, said biasing source biasing said transistor to be normally conducting until a first wheel moves to a point adjacent said detecting device, said biasing source then biasing said transistor to cut off whereby the collector to base junction of said transistor provides a diode having its negative electrode connected to said capacitor and its positive electrode connected to ground for short circuiting signals of negative polarity to ground whereby a positive output from said cell indicative of the temperature of each passing wheel bearing is developed across said load resistor and is referenced from ground or zero potential.

9. In a device for detecting overheated wheel bearings including a heat sensitive cell for developing an output in response to radiant energy impinging thereupon, means for focusing radiant energy from external targets including that energy emanating from passing wheel bearings onto said heat sensitive cell, chopper means for modulating the energy focused onto said cell, means for converting the output of said cell into electrical signals; the combination comprising, heat control means cooperating with said cell for developing an output from said cell which is a single-valued function of the target temperature, a clamping circuit, means for connecting the output from said heat control means to said clamping circuit, said clamping circuit comprising a series connected capacitor and a parallel connected current control device and a parallel connected resistor, said device being connected between said capacitor and ground or zero reference to be nonconductive for signals of positive polartiy and conductive for signals of negative polarity for short circuiting signals of negative polarity to ground, whereby a positive output from said cell indicative of the temperature of each passing wheel bearing is developed across said load resistor and is referenced from ground or zero potential, and means for disabling said clamping circuit until a first wheel moves to a position adjacent said device.

10. In a device for detecting overheated wheel bearings including a heat sensitive cell for developing an output in response to radiant energy impinging thereupon, means for focusing radiant energy from external targets including that energy emanating from passing wheel bearings onto said heat sensitive cell, chopper means for modulating the energy focused onto said cells, means for converting the output of said cell into electrical signals, the combination comprising heat control means cooperating with said cell for developing an output from said cell which is a single-valued function of the target temperature, a clamping circuit, means for connecting the output of said heat control means to said clamping circuit, said clamping circuit comprising a series connected capacitor, a parallel connected current control device and a parallel connected resistor, and said device being connected between said capacitor and ground or zero reference to be nonconductive for signals of positive polarity and conductive for signals of negative polarity for short circuiting said negative polarity signal to ground, whereby an output is developed across said load resistor which is positive and is referenced from ground or zero potential.

11. In a device for detecting overheated wheel bearings including a heat sensitive cell for developing an output in response to radiant energy impinging thereupon, means for focusing radiant energy from external targets including that energy emanating from passing wheel bearings onto said heat sensitive cell, chopper means for modulating the energy focused onto said cell, and means for converting the output of said cell into electrical signals; circuitry for cancelling the output signal from said cell due to the radiant energy emanating from said chopper and for comparing the output signal from said cell due to the radiant energy emanating from the wheel bearings with the output signal from said cell due to the radiant energy emanating from the external ambient temperature, said circuitry comprising, in combination, first means cooperating with said cell for developing an output from said cell which is a single-valued function of the target temperature, a clamping circuit, means for connecting the output of said first means to said clamping circuit, said clamping circuit comprising a series connected capacitor and a parallel connected current control device and a parallel connected resistor, and said device being connected between said capacitor and ground or zero reference to be nonconductive for signals of positive polarity and conductive for signals of negative polarity for short circuiting said negative polarity signal to ground, whereby an output is developed across said load resistor which is positive and is referenced from ground or zero potential.

12. In a device for detecting overheated wheel bearings including a heat sensitive cell for developing an output in response to radiant energy impinging thereupon, means for focusing radiant energy from external targets including that energy emanating from passing wheel bearings onto said heat sensitive cell, chopper means for modulating the energy focused onto said cell, and means for converting the output of said cell into electrical signals; circuitry for cancelling the effect on said cell of the radiant energy emanating from said chopper and for comparing the radiant energy emanating from the wheel bearings with the radiant energy emanating from the external ambient temperature, said circuitry comprising, in combination, means including said chopper for developing a periodic voltage, means for comparing the phase of said periodic voltage with the output signals from said cell for developing a voltage having a polarity dependent on the amplitude of a first output from said cell due to radiant energy from the external targets as compared with the second output from said cell due to radiant energy from said chopper, a clamping circuit, means for coupling the output of said phase comparing means to said clamping circuit, said clamping circuit comprising a series connected capacitor, a parallel connected diode and a parallel connected resistor, the cathode of said diode being connected to said capacitor and the anode of said diode being connected to ground reference for short circuiting signals of negative polarity to ground, whereby the output of said phase comparing means develops an output across said load resistor which is positive and is referenced from ground or zero potential.

13. In a device for detecting overheated wheel bearings including a heat sensitive cell for developing an output in response to radiant energy impinging thereupon, means for focusing radiant energy from external targets including that energy emanating from passing wheel bearings onto said heat sensitive cell, chopper means for modulating the energy focused onto said cell, and means for converting the output of said cell into electrical signals; circuitry for cancelling the effect on said cell of the radiant energy emanating from said chopper and for comparing the radiant energy emanating from the wheel bearings with the radiant energy emanating from the external ambient temperature, said circuitry comprising, in combination, means including said chopper for developing a periodic voltage, means for comparing the phase of said periodic voltage with the output signals from said cell for developing a voltage having a polarity dependent on the amplitude of a first output from said cell due to radiant energy from the external targets as compared with the second output from said cell due to radiant energy from said chopper, clamping circuit, means for coupling the output of said phase comparing means to said clamping circuit, said clamping circuit comprising a series connected capacitor and a parallel connected diode and a parallel connected resistor, the cathode of said diode being connected to said capacitor and the anode of said diode being connected to ground reference polarity for short circuiting signals of negative polarity signal to ground, and means actuated by a wheel for short circuiting said diode and disabling said clamping circuit until the wheel moves to a given point adjacent said cell.

References Cited in the file of this patent

UNITED STATES PATENTS 2,818,508     Johanson et al.            Dec. 31, 1957
2,909,924     Flook et al.               Oct. 27, 1959